Aug. 26, 1924.
J. KJEKSTAD
1,506,532
SHEET CONSTRUCTION AND METHOD OF MAKING SAME
Filed Nov. 29, 1921
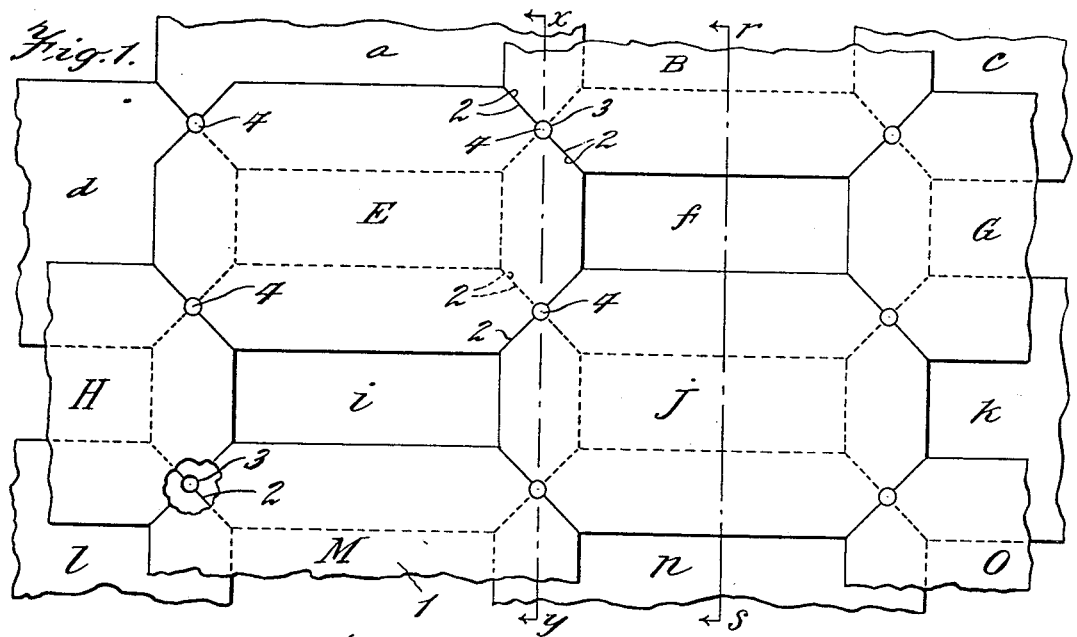
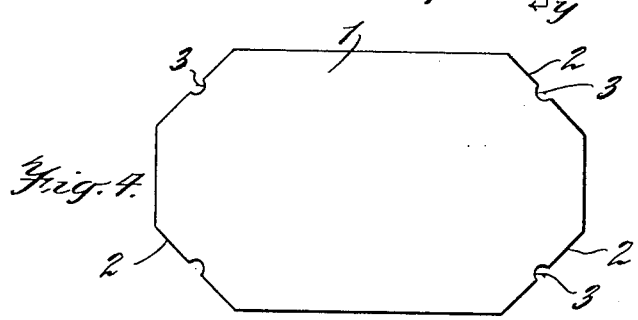
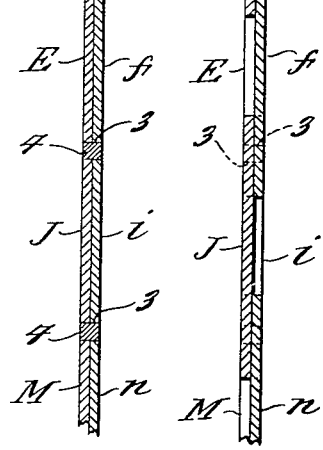
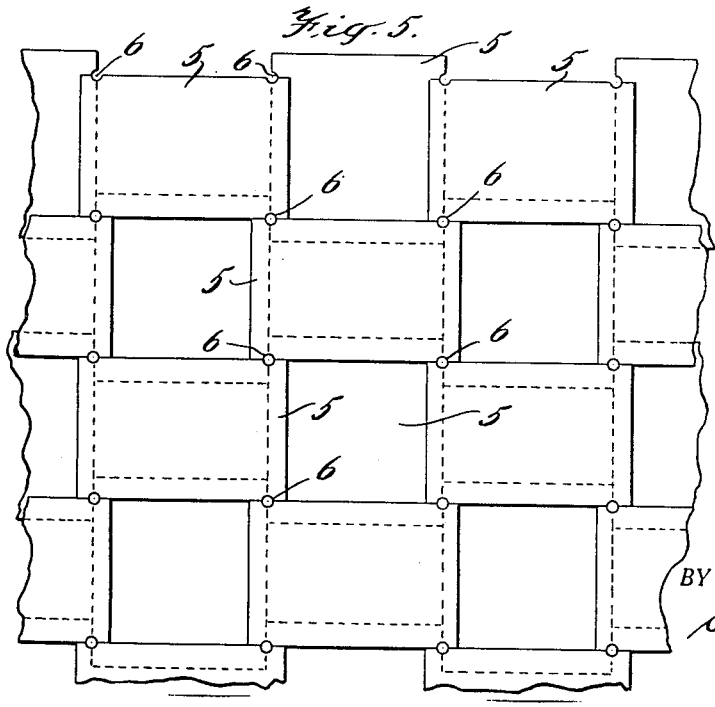
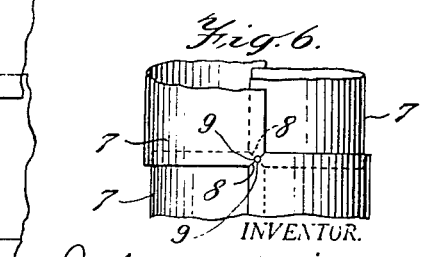

Patented Aug. 26, 1924.

1,506,532

UNITED STATES PATENT OFFICE.

JOHANNES KJEKSTAD, OF NEW YORK, N. Y.

SHEET CONSTRUCTION AND METHOD OF MAKING SAME.

Application filed November 29, 1921. Serial No. 518,733.

*To all whom it may concern:*

Be it known that I, JOHANNES KJEKSTAD, a subject of the King of Norway, residing at the city of New York, in the county of Kings and State of New York, have invented certain new and useful Improvements in Sheet Constructions and Methods of Making Same, of which the following is a full, clear, and exact description.

This invention relates to composite constructions and a method of assembly of the same where a large sheet, pipe, or plate is formed by the assembly of a plurality of small sheets or plates that are then secured to one another in a suitable manner. For example, in the construction of boilers, ships, tanks, pipes, smokestacks, etc., the large walls thereof are formed of a plurality of small plates which overlap with one another and are secured together by rivets, welding, etc. In prior constructions, at the points of intersection of three of the plates, it was necessary to scarf the plates of each layer at their juncture to provide smooth seams and the scarfing is expensive and unsatisfactory.

An object of the invention is to provide an improved composite or sheet construction and improved method of making the same, in which construction scarfing is avoided, in which the greatest thickness is not more than the sum of two thicknesses of the component plates, which can be formed from component plates or units of a single size, and which can be easily and inexpensively assembled. Other objects and advantages will be apparent from the following description and the novel features of the invention will be particularly pointed out in claims.

In the practice of the invention a number of the plates are first arranged in staggered relation to one another with their adjoining edges in the same plane and abutting and overrunning somewhat with one another. A second layer of plates is then placed upon the first layer in a similar staggered relation to one another, but covering the staggered openings between the staggered plates in the first layer. The edges of the plates of the second layer abut with one another and overrun in a manner similar to that in the first layer and overlap the plates of the first layer around the staggered openings. The plates are then secured together in any suitable manner such as by welding. To facilitate the assembly, the abutting edges of the plates of each layer may have, at the points where they cross the abutting edges of the plates in the other plane or layer, complemental notches, such as semi-circles, which form aligned apertures in the superposed layers for the reception of suitable securing devices, such as bolts or rivets, that hold the plates in proper relation while the seams are being riveted or welded, after which the bolts or rivets through the apertures may, if desired, be removed and filled with welding metal. In the preferred embodiment, the successive abutting edges of each plate or unit when extended and when the plate is unrolled into a flat plane make equal angles with one another and the adjacent abutting edges or corners are non-parallel. With this arrangement, all of the plates may then be exact duplicates, which considerably lessens the cost and any possible confusion attendant upon assembly of the component units.

In the accompanying drawing—

Figure 1 is a plan of a sheet constructed in accordance with my invention and illustrating the preferred embodiment;

Figure 2 is a section of the same taken substantially along the line *x*—*y* of Figure 1;

Figure 3 is a section of the same taken substantially along the line *r*—*s* of Figure 1;

Figure 4 is a plan of one of the component plates or units of the same;

Figure 5 is a plan of a sheet constructed in accordance with my invention and illustrating a modified embodiment; and Figure 6 is an elevation of a composite pipe constructed in accordance with my invention.

In the embodiment illustrated in Figures 1 to 4, the sheet construction is formed from a plurality of duplicate component plates or units 1 having cut-off corner edges 2 making angles of 45 degrees with one another when extended. The corner edges are provided with notches 3 for a purpose to be hereinafter explained. A number of the plates, such as *a*, *c*, *d*, *f*, *i*, *k*, *l*, *m*, etc., are arranged in the same plane in staggered relation to one another with their edges 2 abutting and overrunning somewhat with one another. Other of the plates designated B, E, G, H, J, M, O, etc., are arranged in a second plane over the first layer of plates in staggered relation with respect to one another, and with the plates in the second layer covering the apertures formed between the staggered plates of the first layer. The plates of the second layer have their edges 2 abutting and overrunning with respect to one another, and the edges of the plates of the second layer also overlap with the edges surrounding each aperture of the plates of the first layer. It will thus be seen that there will be no open spaces between any of the plates with this arrangement. The notches 3 of the plates of each layer together form apertures in the layer. The notches 3 are disposed in the edges 2 at the points where the abutting edges between the plates of one layer cross the corresponding edges between the plates of the other layer, so that the apertures formed in the abutting edges of the plates in each layer are aligned with corresponding apertures between the plates of the other layer and together form apertures through the superposed plates of both layers. Service bolts or rivets (not shown) may be passed through the aligned apertures so as to clamp the plates of both layers together and hold them in position while the edges of the plates of each layer are welded together and to the plates of the other layer. After the plates are welded, or otherwise secured together, the service bolts or rivets may be removed and the apertures filled with welding metal 4 to render the composite sheet construction imperforate.

In the embodiment illustrated in Figure 5 the plates or units 5 are rectangular in shape, without the cut-off corners, and two of the opposite edges of each plate are provided adjacent their ends with notches 6 which correspond with notches 3 of the plates 1. These plates are assembled in the manner illustrated in Figure 5 and similar to the arrangement shown in Figure 1; the plates of one of the layers, however, of necessity, being larger than the plates of the other layer. The plates of these layers are secured together temporarily by service bolts or rivets in a manner similar to that explained for the construction of Figure 1, while the plates of each layer are being secured together, and to the plates of the other layer, such as by welding or riveting. The service bolts may then be removed and the apertures filled with welding metal as before.

In Figure 6 I have illustrated the application of the invention to composite pipe lines, smokestacks, etc. In such devices the tubes, if of large diameter, are formed of a plurality of small curved plates which are riveted or welded together. It is equally desirous that the maximum thickness at any point be kept to the sum of the thicknesses of two of the plates, and that scarfing be avoided. Accordingly the plates 7 of each layer (outer and inner) are arranged in staggered relation to one another with the abutting edges 8 of the plates of each layer at each corner disposed in the same plane and overrunning with one another somewhat. The corners or edges 8 which abut with the other plates in the same layer may be straight continuations of the edges of rectangular plates as shown in Figure 5, but are preferably cut off at equal angles to the major edge portions as shown in Figures 1 to 4 and 6, since with this arrangement the plates may all be exact duplicates. The edges 8 are also provided with notches 9 which together at the abutting edges form apertures for receiving temporary service bolts or rivets as explained hereinbefore. The seams and abutting edges are welded or otherwise secured, and the apertures may be filled with welding metal or a permanent rivet.

It will be observed that with all of these constructions, the composite sheet at no point has a thickness greater than the sum of the thicknesses of two plates, and that scarfing is unnecessary. The component plates or units of which the composite or sheet construction is formed may be stamped at a single operation, or laid out with a single template. In the embodiment shown in Figures 1 to 4 and 6, but a single size plate is necessary, and in the embodiment shown in Figure 5 but two sizes of plates are necessary. There is sufficient overlap between the plates of each layer so that a very firm seam by either welding or riveting may be obtained.

In the form of plate shown in Figure 4 the successive abutting edges 2 when extended make equal angles with one another, and adjacent corners or edges 2 of each plate are non-parallel so that the plates may all be duplicates and of a single size, and the portions of the edges between the corners or edges 2 may have any desired configuration without interfering with the assembly of the plates in the manner described. For example, the plates may be circular with segments removed to provide the abutting edges.

While I have shown and described the plates as having their successive edges 2 making angles of 45 degrees with one another when extended, it is to be understood that other angles between 0 degree and 90 degrees may be used within the principle of the invention.

It will be understood that by the expression "sheet construction" or "sheet" as used in the specification and claims, I mean a composite construction formed from the component units or plates whether or not the composite sheet and component plates are flat or curved.

It will be obvious that various other changes in the details and arrangements herein described and illustrated may be made by those skilled in the art within the principle and scope of the invention.

I claim:

1. In a sheet formed of connected plates, a plurality of plates arranged in the same plane in staggered relation to one another with their abutting edges overrunning one another and with the aligned plates spaced apart to form staggered openings, and additional plates disposed over the staggered openings between the staggered plates and secured thereto with their edges overlapping the first mentioned staggered plates and with their edges abutting and overrunning with one another.

2. In a sheet formed of connected plates, a plurality of plates arranged in the same plane in staggered relation to one another with their abutting edges overrunning one another and with the aligned plates spaced apart to form staggered openings, and additional plates disposed over the staggered openings between the staggered plates and secured thereto with their edges overlapping the first mentioned staggered plates and with their edges abutting and overrunning with one another, the abutting edges of the plates in each plane, having at the points where they cross the abutting edges of the plates in the other plane, complemental notches to form aligned apertures in the superposed layers of plates for the reception of securing devices to hold the plates together while being permanently connected.

3. In a sheet formed of connected plates, a plurality of duplicate plates arranged in the same plane in staggered relation to one another with abutting edges overrunning one another and with the aligned plates spaced apart to form staggered openings, and additional plates, duplicates of the other plates, disposed over the staggered openings between the staggered plates and secured thereto with the edges of said additional plates overlapping the first mentioned staggered plates and also abutting and overrunning with one another, each of the abutting overrunning edges of each plate being non-parallel to the next adjacent abutting overrunning edge of the same plate, and the successive abutting edges of each plate making equal angles with one another.

4. The method of securing plates together to form a sheet of two-plate thickness, which comprises arranging a number of plates in the same plane in staggered relation to one another with the abutting edges overrunning with one another and with the aligned plates spaced apart to form staggered openings, placing the other plates in a second plane over the staggered openings between the staggered plates in the first plane with their edges abutting and overrunning with one another and also overlapping with the edges of the plates in the first plane, and securing all of the plates together.

5. In a device formed of connected plates, a plurality of duplicate plates arranged in staggered relation to one another, each plate having its corners making equal acute angles with imaginary straight lines joining adjacent corners, the abutting corner edges of the plates overrunning with one another, and additional plates, duplicates of the first mentioned plates, disposed in a second layer to cover the staggered openings between the staggered plates and secured thereto, the abutting edges of the plates of the second layer also overrunning with one another.

In witness whereof, I hereunto subscribe my signature.

JOHANNES KJEKSTAD.